Nov. 16, 1943.  A. CLAUDET  2,334,475
METHOD AND APPARATUS FOR INVESTIGATING EARTH
FORMATIONS TRAVERSED BY BORE HOLE
Filed Dec. 4, 1939   2 Sheets-Sheet 1

INVENTOR
*Aime Claudet*
BY
*Arquet, Meary & Campbell*
ATTORNEYS

Nov. 16, 1943.   A. CLAUDET   2,334,475
METHOD AND APPARATUS FOR INVESTIGATING EARTH
FORMATIONS TRAVERSED BY BORE HOLE
Filed Dec. 4, 1939   2 Sheets-Sheet 2

INVENTOR
Aime Claudet
BY
Hoguet, Neary & Campbell
ATTORNEYS

Patented Nov. 16, 1943

2,334,475

UNITED STATES PATENT OFFICE 2,334,475

METHOD AND APPARATUS FOR INVESTIGATING EARTH FORMATIONS TRAVERSED BY BOREHOLES

Aimé Claudet, Mattoon, Ill., assignor, by mesne assignments, to Schlumberger Well Surveying Corporation, Houston, Tex., a corporation of Delaware Application December 4, 1939, Serial No. 307,474
In France December 3, 1938

28 Claims. (Cl. 250—71)

(Granted under the provisions of sec. 14, act of March 2, 1927; 357 O. G. 5)

The present invention relates to methods and apparatus for investigating earth formations traversed by a bore hole. More particularly it pertains to a new and improved method and apparatus for determining the nature of the formations surrounding the bore hole by studying the effects produced when radiant energy impinges upon the formations.

It has been found that when a beam of radiant energy is directed against a formation, certain effects are produced by means of which it may be readily differentiated from other neighboring formations. For example, certain formations absorb more energy than others and different formations reflect different amounts of energy depending upon their physical properties. Furthermore, certain earth formations, particularly those bearing petroleum, have the ability to transform radiant energy of a given wave length into radiant energy of different wave length, which property enables them to be differentiated from other formations traversed by the bore hole.

It has also been found that when radiant energy is directed against certain formations, the radiant energy emitted therefrom persists for some time after the incident beam has been removed. This property is known as phosphorescence and it provides an additional characteristic for differentiating the various formations penetrated by a bore hole.

It is an object of the invention, accordingly, to provide a method and apparatus for studying the effects produced when earth formations are subjected to radiant energy, whereby the respective formations may be differentiated from each other.

Another object of the invention is to provide a method and apparatus for obtaining indications of the degree to which radiant energy is absorbed by different formations surrounding a bore hole.

A further object of the invention is to provide a method and apparatus for indicating the extent to which radiant energy from an incident beam is reflected from the formations traversed by a bore hole, whereby their respective physical properties may be ascertained.

A still further object of the invention is to provide a method and apparatus of the above character, for studying the selective absorption of radiant energy by earth formations when an incident beam comprising a wide band of frequencies impinges upon them.

Another object of the invention is to provide a method and apparatus for obtaining indication of the ability of the respective formations surrounding a bore hole to fluoresce when radiant energy is directed against them.

A further object of the invention is to provide a method and apparatus for studying the phenomenon of phosphorescence in earth formations when an incident beam of radiant energy impinges thereon, whereby the respective formations may be differentiated from each other.

In accordance with the invention, a source of radiant energy is disposed in the bore hole, thereby providing an incident beam which is directed against the surrounding formations. The incident beam of radiant energy may be composed of a narrow band of frequencies or a wide band of frequencies may be present depending upon the effects being studied. Means is provided for obtaining indications of the effects produced by the beam of radiation energy upon the surrounding formations, which indications are provided either by suitable apparatus located in the bore hole or by indicating means at the surface of the earth.

The receiving apparatus may consist either of one or several photoelectric cells, or a photographic apparatus, or a combination of these different means. It may be also designed so as to make a spectrum analysis of light which is received.

In general, bore holes contain a drilling mud, and their walls are covered by a mud cake formed by the deposit of materials in suspension in the mud (generally clay). In order to eliminate the difficulties introduced by the absorption of light by the mud and by the mud cake, the incident beam and the light emitted by the walls are arranged to pass through a window of transparent material such as glass or quartz, for example, which, according to the invention, is pressed firmly against the wall of the well by appropriate means. In this fashion the window is forced through the mud cake and is applied directly and firmly against the rocks which are not seriously contaminated by the mud.

The apparatus may incorporate also preferably means for scraping and cleaning the wall of the well before the window comes in contact with the formation to be studied, which means is described in greater detail hereinafter.

Before discussing the apparatus in detail, it may be advantageous to discuss briefly several of the methods for determining the nature of the strata surrounding a bore hole in accordance with the invention.

In all forms of the invention, apparatus including a source of radiant energy is lowered into the well to a known depth, for providing a beam of radiant energy comprising a band or bands of waves, the frequencies being the spectral range from infra-red to ultra-violet. Before impinging on the formation to be studied, the incident beam passes through appropriate filters which are designed to transmit only those radiations corresponding to special bands chosen for the observations desired. The beam then passes through a window, made of a material transparent to the light in question, such as, for example, glass, quartz, or other appropriate substance, which as indicated above, is preferably forced through the mud cake against the formation to be studied. The formation, being illuminated by the incident beam, produces different phenomena which may be observed for the purpose of investigating its nature.

The radiant energy in the incident beam is partly absorbed and partly reflected or diffused by the formation on which it impinges. If the incident rays are visible, the study of the intensity of the reflected or diffused light will indicate whether the formations are more or less light or dark. It is evident that sands consisting of grains of clear quartz, for example, will reflect or diffuse the light more strongly than a gray clay or black petroleum-bearing sand. Thus, by registering the intensity of the reflected or diffused light, it is possible to determine the nature of the formation. Furthermore, by tracing diagrams of the intensity of the reflected or diffused light, as a function of the depth in different wells, it is possible to determine, by comparison of the diagrams, the corresponding levels at which the different wells penetrate the same geologic formation.

In practice an incident beam of known or constant color and intensity is used and the intensity of the reflected or diffused light is recorded by means of a photoelectric cell, for example.

In a similar manner, the properties of selective absorption of the rocks for the different color bands of the incident light may be separately studied. This property of selective absorption determines the color of the formations when they are exposed to a light beam. The study may be carried out by directing a beam of white light, for example, on the formations to be studied, and by analyzing the reflected light, for example, by means of a spectrograph.

However, this may be done equally well by dividing the reflected light into several beams, which are passed through different appropriate color filters (three, for example, representing three components of white light, chosen preferably so that the addition of these three colors reproduces the white light), and by focusing the filtered beams either simultaneously on different photoelectric cells, or successively on the same cell. The cell or cells may be connected to one or several electrical measuring instruments located either in the well, or preferably at the surface of the earth, the entire apparatus being designed so as to permit the recording separately of the intensity of different components of the reflected or diffused light.

Certain of the formations encountered possess the ability to transform the incident light into light having a different wave length, generally longer. For example, some formations emit visible light when exposed to ultra-violet radiation. This is the well-known phenomenon of fluorescence, which is particularly characteristic of petroleum.

This phenomenon is utilized according to the invention by projecting on the formations to be studied, a beam of ultra-violet rays, for example, and observing the fluorescent light obtained, by means of a photoelectric cell, for example. The projected beam may be provided by passing radiant energy from a mercury vapor arc through suitable filters which allow only ultra-violet light to pass, in which case the fluorescent light produced should be filtered in such a manner as to cut out ultra-violet radiations which may have been diffused before it is directed to the photoelectric cell. This method provides a very simple and logical means for detecting the presence of petroleum in the formations, even if the quantity of petroleum remaining in the pores is very small. It is only necessary to construct the window of a material transparent to visible and ultra-violet light, such as, quartz, for example.

In general, the fluorescent light, as a color, depends on the nature of petroleum or of oil which produces it. For example, refined oil, such as that used for lubrication, may give a pale blue light, while crude oil gives, in certain cases, a clear yellow color. On the other hand, certain mineral constituents of rocks, or certain natural substances, such as sulphur, which may exist in the formations, produce, by themselves, a certain amount of fluorescence. Hence it may be of interest, in certain cases, according to the invention, to analyze the color of the fluorescent light produced in order to differentiate the various substances which are capable of producing this light. An analysis of this character may be made as described previously, for example by means of different filters, or by direct spectrum analysis of the fluorescent light. This process is of interest, in particular, in distinguishing different petroleum-bearing horizons on the basis of different colors of the fluorescence which is created.

It is also possible in accordance with the invention, to distinguish petroleum from other substances which are fluorescent but of different color (the petroleum-bearing formations are generally of dark color) by studying successively or simultaneously, by means of an apparatus combining the two variations of the method, the properties of absorption and fluorescence of the walls, according to the procedure outlined above.

As indicated above, the phenomenon of phosphorescence may be used, according to the invention, in order to differentiate optically the formations penetrated by a well. An appropriate method of investigating the formations comprises the steps of interrupting periodically the incident beam (ultra-violet, for example) and obtaining indications of the phosphorescent light given off by the formations during the time the incident light beam is interrupted, by means of a photoelectric cell, for example. The investigation of phosphorescent properties of the formations may be combined with the investigation of their fluorescent properties by using another photoelectric cell, for example, for obtaining indications of the light emitted when the incident rays impinge upon the formation being studied.

The invention may be better understood from the following detailed description taken in connection with the accompanying drawings in which.

Figures 1, 2, 3, 3A, 4:
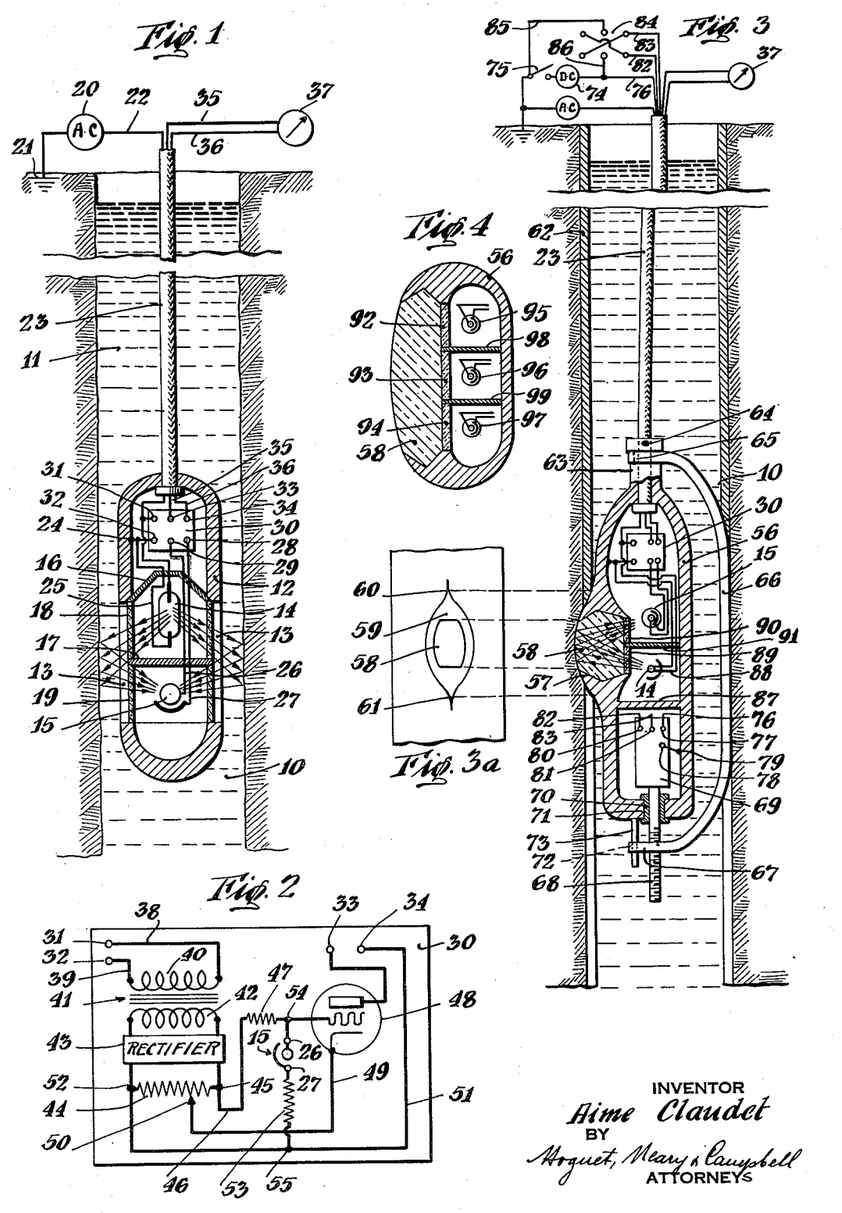
Figure 1 is a diagrammatic illustration of apparatus constructed according to the invention for analyzing light diffused from a previously clean wall.
Figure 2 is a schematic diagram of an amplifier circuit for use with the apparatus shown in Figure 1.
Figure 3 illustrates diagrammatically a modified form of apparatus for use in wells having mud caked walls and containing a substantially opaque mud.
Figure 3a represents a detail of the apparatus shown in Figure 2.
Figure 4 is a view in section illustrating a modification of the apparatus shown in Figure 3.

Referring to Figure 1, the bore hole 10 usually contains drilling mud 11 into which the investigation apparatus is adapted to be lowered. The optical and electrical apparatus used in the method is contained in a metallic casing 12 which is adapted to be lowered into the bore hole 10 in the conventional manner. The casing 12 is provided with a window 13, made of material transparent to the light which is to be used, for example, glass or quartz. The window 13 extends around the complete circumference of the case, so that the incident light may be sent in all directions against the wall of the hole at the moment of observation.

Within the casing 12 is provided a source of visible or invisible light 14 the radiation from which is directed by a reflector 16 against the wall of the hole, through the window 13. The incident light falling on the wall of the hole is partially diffused, and a part of the diffused light is transmitted through the window 13 to a photoelectric cell 15. The source of light 14 and the cell 15 are separated by an opaque screen 17. Adjacent the window 13 are placed the filters 18 and 19, the filter 18 being designed to pass only the band or bands of wave length with which it is desired to illuminate the walls of the hole, and the filter 19 being designed to pass only the band or bands of wave length of the diffused light which it is desired to analyze.

The source 14, which, for example, may be a mercury vapor arc, should be preferably supplied by means of an electrical source 20 situated at the surface of the earth, one terminal of which is connected to a grounded point 21 and the other terminal of which is connected to a conductor 22 in the cable 23 on which the casing is supported in the bore hole. The conductor 22 is connected to one terminal of the light source 14, the other terminal of which is grounded to the metallic casing 12 at the point 24 through a conductor 25, the circuit being completed through the earth.

The cell 15 is connected by the leads 26 and 27 to the terminals 29 and 28, respectively, of a conventional amplifier 30 which is shown in greater detail in Figure 2. The amplifier 30 is adapted to be energized from the source 20 and to this end, it is provided with a pair of terminals 31 and 32 which are connected to the conductors 22 and 25, respectively. The output of the amplifier 30 appears across the terminals 33 and 34 thereof whence it is transmitted through the conductors 35 and 36 in the cable 23 to a suitable potential difference indicating instrument 37 located at the surface of the earth.

Referring to Figure 2, the energizing terminals 31 and 32 of the amplifier 30 are connected through the leads 38 and 39, respectively, to the primary winding 40 of a transformer 41, the secondary winding 42 of which is connected to a conventional type rectifier circuit 43. The rectified output from the rectifier 43 is impressed on a voltage divider 44 from which appropriate voltages may be obtained for the operation of the amplifier 30.

The negative terminal 45 of the voltage divider 44 is connected through a conductor 46 and a series resistor 47 to the grid of a vacuum tube 48. In order that the tube 48 may be biased negatively, its cathode is connected through a lead 49 to a point 50 on the voltage divider 44 which is positive with respect to the negative terminal 45. The plate of the tube 48 is connected to the terminal 33 which in turn is connected through the conductor 35 in the cable 23 to the instrument 37 at the surface of the earth. The plate circuit of the tube 48 is completed through a conductor 36 in the cable 23 which is connected to the amplifier terminal 34, the terminal 34 being connected through a conductor 51 to the positive terminal 52 of the rectifier 43.

The photoelectric cell 15 is connected across the terminals 26 and 27 of the amplifier 30 in series with a protective resistor 53, one end of the circuit being connected to the grid of the tube 48 at 54 and the other end of the circuit being connected to the conductor 51 at the point 55.

In operation, the apparatus may be moved continuously along the hole, while the desired indications are being obtained. However, if desired, the indications may also be made in a discontinuous manner, the apparatus being halted successively at different points along the interior of the well for this purpose.

If the source emits rays to which the cell is sensitive, it is possible to illuminate the wall of the hole with a known color, either by choice of a special source, or by means of suitable filters. The intensity of the light diffused and reflected from the wall and which illuminates the cell, depends on the transparency of the formations, that is to say, their ability to diffuse a more or less large quantity of light. Since the current flowing through the cell varies with its illumination, it is possible to record electrically, in a continuous manner, a diagram which indicates quantities proportional to the intensity of the light diffused by the formations, and which consequently is indicative of the absorption coefficient of the formations for the light used.

Likewise, it is possible to utilize an incident beam consisting only of ultra-violet light, and to record the fluorescence of the formation. For this purpose, the filter 18 should be designed to transmit only ultra-violet radiations, and the filter 19 should be designed to block ultra-violet radiations, but to allow passage of visible light. If the formation on which the light impinges has the property of fluorescence as, for example, in the case of a petroleum-bearing bed, the cell will be illuminated by the secondary radiation from the formations, and it is possible, as indicated above, to detect the presence of beds containing petroleum by observing the response of the photoelectric cell 15. In this case the window 13 should be made of a substance which is transparent to both visible and ultra-violet radiations, as, for example, quartz.

The apparatus shown in Figure 3 is similar to that shown in Figure 1 except that it includes means for eliminating the absorption of the light by the drilling mud 11 and the mud cake 62, both of which are generally opaque. The mud cake 62 exists principally on the walls of the more permeable beds such as sands, where it may be several millimeters in thickness.

Considering Figure 3, the investigation device comprises a metallic casing 56 in one wall of which is provided an aperture 57 within which a window 58 comprising a lens of transparent material is adapted to be mounted. The mounting for the lens 58 comprises a longitudinally stream-lined raised portion 59 having pointed extremities 60 and 61 which serve to cut through the mud cake 62 existing on the walls of the drill hole 10. This construction is shown in greater detail in Figure 3a.

The window 58 is constructed of a material, such as quartz, which is sufficiently resistant to withstand the friction of the wall, at least for the duration of the complete operation. The window 58 is adapted to be inserted from the interior of the housing, by means of apparatus not shown in the drawings, so that it may be easily changed if it is worn out. On the other hand, the quartz being much harder than the steel of the housing, it is worn much less rapidly by friction, even though the window 58 always projects and comes into direct contact with the formations not invaded by the drilling mud 11. Furthermore, the scratching of the surface of the lens, caused by friction with hard constituents of the rock (grains of silicate, in particular), is of little importance optically, since the surface of the window is in immediate contact with the formation and remains against the surface to be observed.

The metallic casing 56 is provided at its upper extremity with a hollow upwardly-extending tubular shaft 63 which terminates in a laterally extending flange 64. Journaled on the tubular shaft 63 is a collar 65, formed at one of the extremities of a bifurcated leaf spring 66. The spring 66 serves to force the metallic casing 56 laterally into the formation, thereby pushing the lens 58 through the mud cake 62 until it is directly in contact with the formations being investigated. The collar 65 is keyed on the tubular portion 63 so as to prevent any rotation of the spring 66 relative to the tubular shaft 63.

At the other extremity of the leaf spring 66 is formed a collar 67 which is internally threaded to receive an externally threaded shaft 68 of an electric motor 69 which is secured within the lower portion of the metallic casing 56. The shaft 68 extends through an aperture 70 formed in the lower wall of the metallic casing 56 and suitable packing 71 is provided in order to prevent any seepage of the bore hole liquid 11 into the casing 56.

The collar 67 is provided with a narrow bore 72 which is adapted to receive a pin 73 secured to the metallic casing 56, which serves to prevent rotation of the spring 66 relative to the casing 56 and which also guides the collar 67 when the latter is moved longitudinally by the rotation of the shaft 68 as will be described hereinafter.

It will be observed that for rotation of the shaft 68 in one direction the collar 67 on the spring 66 will be moved longitudinally in a downward direction, thereby causing the spring to move laterally and inwardly away from the walls of the bore hole 10, thus permitting the entire apparatus to be moved freely therein. For rotation of the shaft 68 in the reverse direction the collar 67 is moved upwardly and longitudinally, causing the central portion of the spring 66 to move outwardly and laterally into the walls of the bore hole 10, thereby forcing the lens 58 through the mud cake 62 until it is in contact with the formations to be investigated. The assembly is designed so that the spring 66 may exert a force of from a few to ten or more kilograms when the lens 58 is forced into a formation.

The motor 69 is adapted to be energized by a source of direct current voltage 74 located at the surface of the earth, one terminal of which is connected to the ground 21 through a switch 75 and the other terminal of which is connected through a conductor 76 within the cable 23 to one armature terminal 77 of the motor 69, the other armature terminal 78 of which is grounded to the casing 56 at the point 79, the circuit being completed through the liquid 11 in the bore hole and the surrounding earth formations.

In order that the direction of rotation of the motor 69 may be reversed as desired, the field winding terminals 80 and 81 thereof are connected through the conductors 82 and 83, respectively, within the cable 23 to a reversible switch 84 at the surface of the earth, the knife blades of which are connected through the conductors 85 and 86 and through the switch 75 to the terminals of the direct current source 74. Accordingly, for one position of the reversing switch 84, the motor 69 will rotate in one direction and for the reverse position the motor 69 will rotate in the opposite direction, thereby enabling the spring 66 to be moved into or out of engagement with the walls of the bore hole for the purpose of forcing the lens 58 through the mud cake 62 into contact with the formations and for withdrawing it therefrom after the desired indications have been obtained.

It will be apparent that suitable relays controlled from the surface of the earth could be employed for reversing the connections to the field winding of the motor 69, instead of the system shown in Figure 3 and described above.

Within the metallic casing 56 and above a tight transverse partition 87 therein is located the source of visible or invisible light 14, the light from which is adapted to be directed by means of a reflector 88 through a suitable filter 89 and the lens 58 to the formations being investigated. The light reflected or diffused from the formations is transmitted through the lens 58 and through another selective filter 90 to the photoelectric cell 15 which is connected to the amplifier 30 as indicated in Figure 1. The photoelectric cell 15 is separated from the source of light 14 by an opaque filter 91 which extends from one wall of the casing 56 to the filters 89 and 90.

If desired, the chamber which houses the light source 14 may be filled with a suitable transparent liquid for conducting any heat produced by the source 14 to the metallic casing 56.

The apparatus shown in Figure 3 operates essentially in the same manner as that illustrated in Figure 1, and indications may be obtained either of the transparency and brilliancy of the wall or of its fluorescence. It is usually advantageous to obtain the desired indications in the form of a permanent record in the usual manner.

The apparatus shown in Figure 3 may be modified as shown in Figure 4 where it is desired to study the selective absorption by the formations of radiant energy impinging thereon. This is accomplished in Figure 4 by disposing three filters 92, 93 and 94 behind the lens 58, each filter being adapted to pass only one of the three fundamental colors. For example, the filter 92 transmits only blue light, the filter 93 transmits only red light, and the filter 94 transmits only yellow light. The three beams transmitted by the filters 92, 93 and 94 are directed to three corresponding photoelectric cells 95, 96 and 97, respectively, which are disposed within the metallic casing 56 and which are separated from one another by means of opaque light filters 98 and 99 extending from the rear wall of the housing 56 to the plane of the rear wall of the filters 92, 93 and 94.

Each of the photoelectric cells 95, 96 and 97 may be connected to an amplifier similar to the amplifier 30 which is shown in Figure 1 for operating a potential indicating instrument similar to the instrument 37 shown in Figure 1. In this fashion it is possible to obtain separate indications of the selective color absorption of any particular formation traversed by a bore hole. In this connection, the indications might also be obtained by suitable recording equipment lowered in the bore hole.

Figure 5:
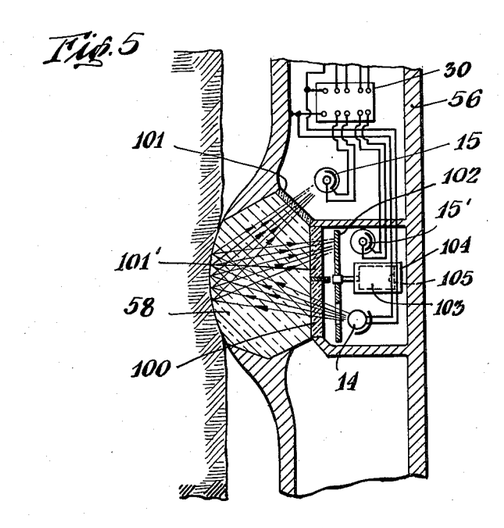
Figure 5 is a partial view in longitudinal section of apparatus adapted for the simultaneous analysis of the properties of fluorescence and of phosphorescence of the formations comprising the wall of the hole.

Figure 5 illustrates a modification of the apparatus shown in Figure 3 which is an optical system designed to enable the phosphorescence of formations, or the phosphorescence and fluorescence to be studied simultaneously. This figure does not show the well, the formations, the complete case and support, all of which may be exactly the same as in Figure 2. Only the optical apparatus, which differs from that represented in Figure 2, is shown.

Figure 5A:
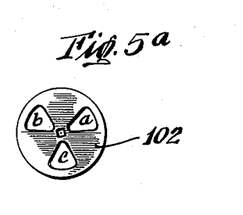
Figure 5a represents a detail of the apparatus shown in Figure 3.

In this modification, the light source 14 and a photoelectric cell 15' are disposed in the same vertical plane within the casing 56. In front of the cell 15' and the source 14 is an opaque screen 102 adapted to be rotated by a motor 103, the function of which is to interrupt periodically both the light projected from the source 14 and the light impinging on the cell 15'. As shown in Figure 5a, the apertures a, b and c in the disc 102 are so spaced that when the beam projected from the source 14 passes through one aperture, the passage of diffused light to the cell 15' is blocked, and vice versa.

The motor 103 may be enclosed in a suitable casing 105, and the photoelectric cell 15' may be separated from the source 14 by a light tight partition, the projection of which on the drawing coincides with the trace of the axis of the shaft of the motor 103.

The source 14 is adapted to provide a beam of ultra-violet radiation to be directed through the lens 58 against the formations being investigated. Accordingly, a filter 100 is disposed in front of the source 14 which is so designed that it will transmit only ultra-violet radiation. In order that the visible radiation produced by fluorescence from the formations may be observed, it is desirable that ultra-violet radiation be prevented from reaching the photoelectric cell 15 which provides indications of such secondary radiation. Accordingly, an optical filter 101 is disposed in front of the cell 15 which is designed to pass visible light, but to block ultra-violet light.

In similar fashion an optical filter 101' is disposed in front of the photoelectric cell 15' which serves to prevent ultra-violet radiation from influencing the indications obtained thereby.

In operation, if it be assumed that one of the apertures in the rotating screen 102 is opposite the light source 14 a beam of ultra-violet light will be transmitted therethrough and through the filter 100 and the lens 58 to the formations being investigated. The visible light diffused from the formations is thereupon transmitted through the lens 58 and filter 101 to the photoelectric cell 15 whose current variations are amplified by the amplifier 30 to provide readings at a suitable potential indicating instrument (not shown). Hence, the photoelectric cell 15 and its associated circuits provide indications of the fluorescence of the formations.

However, since the path of the diffused secondary radiation to the photoelectric cell 15' is blocked by the opaque screen 102, no indication is produced thereby. As the disc 102 continues to rotate, the beam projected from the source 14 is blocked and one of the apertures in the disc 102 is brought into registry with the photoelectric cell 15', thereby permitting any secondary radiation caused by the phenomenon of phosphorescence to pass thereto. Accordingly, the apparatus disclosed in Figure 5 enables indications to be obtained simultaneously of both fluorescence and phosphorescence of the formations being investigated.

Figure 6:
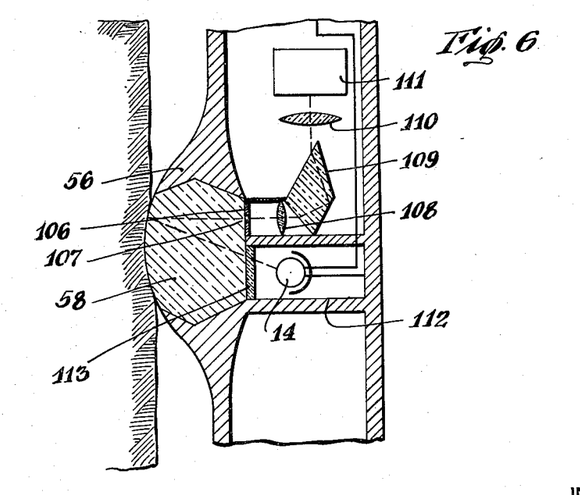
Figure 6 is a partial view in longitudinal section showing apparatus for spectroscopic analysis of the light diffused from the wall of the hole.

The modification disclosed in Figure 6 enables the light reflected from the formations being investigated to be analyzed spectroscopically, the spectrum obtained being photographed by means of a camera or some analogous device. Referring to Figure 6, light transmitted through the lens 58 is directed to a collimator which comprises an opaque disc 106 having a pin hole aperture 107 therein, and a lens 108 so disposed with respect to the disc 106 that a beam of parallel rays is formed. The beam of parallel rays is directed against one face of a prism 109 which is so designed that the emergent beam has a mean direction perpendicular to the incident beam. The spectrum provided by the prism 109 is then transmitted through a conventional lens arrangement 110, the function of which is to focus the spectrum upon the photographic film within a conventional type camera 111 which is disposed within the casing 56.

The light source 14 is located in a chamber 112 within the casing 56 and it is adapted to direct a beam of radiation through a suitable filter 113 and through the lens 58 to the formations being investigated, thereby providing a reflected or diffused beam which is to be analyzed spectroscopically.

The beam of light from the source 14 is transmitted through the filter 113 and the lens 58 to the formations under consideration. Part of the light reflected or diffused by the formations passes through the aperture 107 in the disc 106, and through the lens 108, thereby providing a parallel beam of rays. The parallel beam is projected on one face of the prism 109, taking the path indicated generally by the dotted line, and the spectrum produced is focused by the lens 110 upon the photographic film in the photographic apparatus 111.

The photographic apparatus 111 may be designed to unroll a quantity of film proportional to the displacement of the apparatus along the bore hole. This may be accomplished continuously by any suitable means, as for example, a clock mechanism, and a continuous and complete diagram of the variations of the spectrum of the light diffused by the wall of the well may be obtained as the apparatus is moved therethrough.

The corresponding depths of the apparatus may be recorded on the film by a simple process consisting in making a mark on the film, for example by rapidly closing and opening the circuit supplying the light source 14 at the moment when the apparatus passes known and regularly chosen depth intervals.

The apparatus for spectroscopic analysis may be suitable in the case where the light 14 is a source containing a large range of frequencies as, for example, white light. In this case, the spectroscope allows an analysis of the color of the walls of the hole. For the same purpose, a system of filters may be used, as in Figure 1, to register an analysis of the fluorescent light emitted by the wall.

If the source 14, combined with the filter 113, gives a band of ultra-violet light, the apparatus provides a spectroscopic analysis of the fluorescent light furnished by the wall.

It will be readily apparent that where a plurality of photoelectric cells are used, a plurality of amplifiers similar to that illustrated in Figure 2 may be employed, together with the necessary potential indicating instruments. In this connection, the light source 14 could be energized by direct current, in which case the rectifier 43 and the transformer 41 might be eliminated.

Although several specific embodiments have been described above, the invention is not intended to be limited thereto, since numerous modifications might be made in these embodiments within the scope of the invention. For example, the intensity of the light emitted by the formations might be recorded on a photographic device. Also indications of the intensity of the light could be obtained by using one or more photoelectric cells, the current variations of which might be indicated by means of an electrical apparatus situated inside the body of the equipment and lowered into the well. It would also be possible to supply current to the light source by means of an electrical generator, lowered into the well with the apparatus.

The several specific embodiments of the invention described above are not intended to impose any limitation whatsoever upon the invention, but they are susceptible of numerous changes in form and detail within the scope of the appended claims.

I claim:

1. A method for investigating earth formations traversed by a bore hole comprising the steps of directing radiant energy in the ultraviolet-infrared band of the spectrum to the formation in place at a given depth in the bore hole and obtaining indications of the effects produced by the radiant energy impinging thereupon.

2. A method for investigating earth formations traversed by a bore hole comprising the steps of directing radiant energy to the formation in place at a given depth in the bore hole and obtaining indications of the radiant energy reflected by the formation in place at said depth.

3. A method for investigating earth formations traversed by a bore hole comprising the steps of directing radiant energy to the formation in place at a given depth in the bore hole and obtaining indications of the radiant energy absorbed by the formation in place at said depth.

4. A method for investigating earth formations traversed by a bore hole comprising the steps of directing radiations of different frequencies to the formation at a given depth in the bore hole, and obtaining indications of the relative absorption of said radiations of different frequencies by the formations.

5. A method for investigating earth formations traversed by a bore hole comprising the steps of directing radiations of given frequency in the ultraviolet-infrared band of the spectrum to the formation at a given depth in the bore hole, and obtaining indications of any radiations of different frequency emitted by the formation in place at said depth.

6. A method for investigating earth formations traversed by a bore hole comprising the steps of directing radiant energy in the ultraviolet-infrared band of the spectrum to the formation at a given depth in the bore hole for a given period of time, and obtaining indications of any radiant energy emitted by the formation at said depth when the directing of energy thereto is discontinued.

7. A method for investigating earth formations traversed by a bore hole comprising the steps of directing a beam of radiant energy to the formation at a given depth in the bore hole, interrupting said beam of radiant energy and obtaining indications of the effects produced by the radiant energy impinging upon the formation at said depth both when the beam impinges upon the formation and when the beam is interrupted.

8. A method for investigating earth formations traversed by a bore hole comprising the steps of directing a beam of radiant energy of different frequencies to the formation at a given depth in the bore hole, separating the radiant energy reflected from the formation at said depth into several components, and obtaining indications of a characteristic of said separated components.

9. A method for investigating earth formations traversed by a bore hole comprising the steps of directing a beam of radiant energy of given wave length to the formation at a given depth in the bore hole, separating any radiant energy of different wave lengths emitted from the formation at said depth into several components and obtaining indications of a characteristic of said separated components.

10. Apparatus for investigating earth formations traversed by a bore hole, comprising a body adapted to be lowered into a bore hole and having a raised window therein, a source of radiant energy in the body for directing radiant energy through the window to the surrounding formations, means for applying force to the body to cause the window to move into close proximity with the formations and means in the body responsive to radiant energy transmitted through the window from the formations.

11. Apparatus for investigating earth formations traversed by a bore hole, comprising a body adapted to be lowered into a bore hole and having a laterally projecting window therein, adjustable means for urging the body laterally in the bore hole to move the window into close proximity with the surrounding formations, means associated with the window for scraping the wall of the bore hole as the body is moved therein, photosensitive means in the body, responsive to radiant energy transmitted through the window from the formations, means for amplifying the response of said photosensitive means, and means for providing indications of said amplified response.

12. In apparatus for investigating earth formations traversed by a bore hole, the combination of a body adapted to be lowered into a bore hole, and laterally adjustable means on the body for moving said body into close proximity with the walls of the bore hole.

13. In apparatus for investigating earth formations traversed by a bore hole, the combination of a body adapted to be lowered into the bore hole, an upwardly extending shaft formed adjacent the upper extremity of the body, a rotatable externally threaded shaft formed adjacent the lower extremity of the body, a bifurcated spring element, said spring element having a collar at one end thereof journalled on said upwardly extending shaft, and having an internally threaded collar at the other end thereof in which said rotatable externally threaded shaft is adapted to be received, means for preventing longitudinal movement of said first collar relative to its shaft, means in the body for rotating said externally threaded shaft to move said second collar relative to the body, and means for reversing the direction of rotation of said rotating means.

14. In apparatus for investigating earth formations traversed by a bore hole, the combination of a body adapted to be lowered into a bore hole and having a window in the lateral wall thereof, a source of radiant energy in the body, means for directing radiant energy from said source to the formations, a plurality of radiation filters disposed behind said window, each filter being adapted to transmit radiations of given frequency only and means for providing indications of the radiation transmitted by said respective filters.

15. Apparatus for investigating earth formations traversed by a bore hole comprising a body adapted to be lowered into a bore hole and having a window therein, a source of radiant energy in the body, means for directing a beam of radiant energy from the source and through the window to the surrounding formations, a filter in the path of said beam permitting the passage of radiant energy of given frequency only to the formations, a pair of photosensitive elements responsive to radiant energy transmitted through the window from the formations, a filter for blocking the passage of radiant energy of said given frequency to said photosensitive elements, means for alternately interrupting the beam of radiant energy directed to the formations, and the radiant energy transmitted from the formations to one of said photosensitive elements, and means for providing indications of the response of said photosensitive elements.

16. Apparatus for investigating earth formations traversed by a bore hole, comprising a body adapted to be lowered into a bore hole and having a window therein, a source of radiant energy in the body, means for directing a beam of radiant energy of given frequencies from the source and through said window to the surrounding formations, means for separating radiant energy transmitted through the window from the formations into a spectrum, and photographic means in the body for providing a record of the intensities of the component frequencies of radiant energy comprising said spectrum.

17. In apparatus for use in bore holes, the combination of a unit adapted to be lowered into a bore hole, a longitudinally extending leaf spring secured to the unit, and means for adjusting the spacing between the ends of said spring to move a portion thereof laterally toward or away from the unit, selectively, whereby the unit may be moved into abutting engagement with the side wall of the bore hole and thereafter released from such engagement.

18. A method for investigating earth formations traversed by a bore hole comprising the steps of directing radiant energy in the ultraviolet-infrared band of the spectrum to the formations in place at different depths in the bore hole, and obtaining indications at said different depths of an effect produced by the radiant energy impinging upon the formations in place, whereby the relative characteristics of the formations may be ascertained by comparing the indications obtained at said different depths.

19. A method for investigating earth formations traversed by a bore hole comprising the steps of directing radiant energy to the formations in place at different depths in the bore hole, and obtaining indications at said different depths of the radiant energy reflected by the formations, whereby the relative characteristics of the formations in place may be ascertained by comparing the indications obtained at said different depths.

20. A method for investigating earth formations traversed by a bore hole comprising the steps of directing radiant energy to the formations in place at different depths in the bore hole, and obtaining indications at said different depths of the radiant energy absorbed by the formations in place, whereby the relative characteristics of the formations may be ascertained by comparing the indications obtained at said different depths.

21. A method for investigating earth formations traversed by a bore hole comprising the steps of directing radiant energy of different frequencies to the formations at different depths in the bore hole, and obtaining indications at said different depths of the relative absorption of said radiations of different frequencies by the formations, whereby the relative characteristics of the formations may be ascertained by comparing the indications obtained at said different depths.

22. A method for investigating earth formations traversed by a bore hole comprising the steps of directing radiant energy of given frequency in the ultraviolet-infrared band of the spectrum to the formations in place at different depths in the bore hole, and obtaining indications at said different depths of the radiant energy of different frequency emitted by the formations in place, whereby the relative characteristics of the formations may be ascertained by comparing the indications obtained at said different depths.

23. A method for investigating earth formations traversed by a bore hole comprising the steps of directing radiant energy in the ultraviolet-infrared band of the spectrum to the formations at different depths in the bore hole for a given period of time, and obtaining indications at said different depths of any radiant energy emitted by the formations when the directing of energy thereto is discontinued, whereby the relative characteristics of the formations may be ascertained by comparing the indications obtained at said different depths.

24. A method for investigating earth formations traversed by a bore hole comprising the steps of directing a beam of radiant energy to the formations at different depths in a bore hole, interrupting said beam of radiant energy, and obtaining indications at said different depths of the effects produced by the radiant energy impinging upon the formations at said different depths both when the beam impinges upon the formations and when the beam is interrupted, whereby the relative characteristics of the formations may be ascertained by comparing the indications obtained at said different depths.

25. A method for investigating earth formations traversed by a bore hole comprising the steps of directing a beam of radiant energy of different frequencies to the formations at different depths in a bore hole, separating the radiant energy reflected from the formations at said different depths into a plurality of components and obtaining indications of characteristics of said separated components at said different depths, whereby the relative characteristics of the formations may be ascertained by comparing the indications obtained at said different depths.

26. A method for investigating earth formations traversed by a bore hole comprising the steps of directing a beam of radiant energy of given wave length to the formations at different depths in a bore hole, separating any radiant energy of different wavelengths emitted from the formations at said different depths into a plurality of components, and obtaining indications at said different depths of characteristics of said separated components, whereby the relative characteristics of the formations may be ascertained by comparing the indications obtained at said different depths.

27. A method for investigating earth formations traversed by a bore hole having a wall covered by a layer of mud, comprising the steps of removing a portion of said mud layer at different depths in the bore hole to expose the surrounding earth formations, directing radiant energy in the ultraviolet-infrared band of the spectrum to the formations at said different depths, and obtaining indications at said different depths of an effect produced by the radiant energy impinging upon the formations, whereby the relative characteristics of the formations may be ascertained by comparing the indications obtained at said different depths.

28. In apparatus for use in bore holes, the combination of a unit adapted to be lowered into a bore hole, a positioning element secured to the unit, said element having a bearing portion adapted to be moved laterally with respect to the unit, and electrical means, controllable from the surface of the earth, for actuating said element selectively to move said bearing portion thereof laterally toward or away from the unit, whereby the unit may be moved into abutting engagement with the side wall of the bore hole and thereafter released from such engagement.

AIMÉ CLAUDET.

CERTIFICATE OF CORRECTION.

Patent No. 2,334,475.                                                November 16, 1943.

AIME CLAUDET.

It is hereby certified that error appears in the printed specification of the above numbered patent requiring correction as follows: Page 6, second column, line 4, claim 4, for "formations" read --formation at said depth--; line 9, claim 5, after "formation" insert --in place--; page 7, second column, line 22, claim 19, after "formations" insert --in place--; line 23, same claim, after "formations" strike out --in place--; and that the said Letters Patent should be read with this correction therein that the same may conform to the record of the case in the Patent Office.

Signed and sealed this 18th, day of January, A. D. 1944.

(Seal)

Henry Van Arsdale,
Acting Commissioner of Patents.